United States Patent
Samuel et al.

(10) Patent No.: US 10,331,610 B2
(45) Date of Patent: Jun. 25, 2019

(54) UART WITH AUTOMATED PROTOCOLS

(71) Applicant: Microchip Technology Incorporated, Chandler, AZ (US)

(72) Inventors: Roshan Samuel, Chandler, AZ (US); Janmichael Aberouette, Gilbert, AZ (US); Ward Brown, Chandler, AZ (US); Chintan Desai, Chandler, AZ (US); Brant Ivey, Chandler, AZ (US); Razvan Dochia, Bucharest (RO)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 153 days.

(21) Appl. No.: 15/185,257

(22) Filed: Jun. 17, 2016

(65) Prior Publication Data
US 2016/0371220 A1 Dec. 22, 2016

Related U.S. Application Data

(60) Provisional application No. 62/181,533, filed on Jun. 18, 2015.

(51) Int. Cl.
*G06F 9/00* (2006.01)
*G06F 13/42* (2006.01)
*G06F 13/38* (2006.01)

(52) U.S. Cl.
CPC .......... *G06F 13/426* (2013.01); *G06F 13/385* (2013.01); *G06F 13/4295* (2013.01)

(58) Field of Classification Search
None
See application file for complete search history.

(56) References Cited

U.S. PATENT DOCUMENTS

| | | | |
|---|---|---|---|
| 5,371,736 A | 12/1994 | Evan | 370/470 |
| 6,263,033 B1 * | 7/2001 | Hansen | G06F 13/385 370/305 |
| 8,432,106 B2 * | 4/2013 | Horvath | H05B 33/0818 315/185 R |
| 9,788,375 B2 * | 10/2017 | Hasegawa | H05B 33/0815 |
| 2013/0297831 A1 | 11/2013 | Laurentiu | 710/5 |
| 2015/0074306 A1 | 3/2015 | Ayyagari et al. | 710/110 |

OTHER PUBLICATIONS

Atmel, ARM-Based Embedded MPU, 2011-10, Atmel, p. 1-4.*
Elation, DMX101: A DMX 512 Handbook, 2008, Elation, pp. 1-24.*
International Search Report and Written Opinion, Application No. PCT/US2016/038312, 10 pages, dated Sep. 1, 2016.

* cited by examiner

*Primary Examiner* — Cheng-Yuan Tseng
(74) *Attorney, Agent, or Firm* — Slayden Grubert Beard PLLC

(57) ABSTRACT

A universal asynchronous receiver/transmitter (UART) interface is disclosed. The UART interface may include a configurable asynchronous receiver and transmitter unit; and a configurable state machine, wherein the state machine allows configuration of the receiver and transmitter unit to support various baud rates and provide for start bit and stop bit configuration, wherein the state machine is further configurable to automatically support a plurality of communication protocols.

18 Claims, 15 Drawing Sheets

UART WITH AUTOMATED PROTOCOLS

CROSS-REFERENCE TO RELATED APPLICATIONS

This application claims priority to commonly owned U.S. Provisional Patent Application No. 62/181,533; filed Jun. 18, 2015; which is hereby incorporated by reference herein for all purposes.

TECHNICAL FIELD

The present disclosure relates to serial interfaces, in particular to a universal asynchronous receiver/transmitter ("UART") interface with automated protocols.

BACKGROUND

UARTs are well known and commonly used in microcontrollers to provide a communication channel. A UART interface translates parallel data into a serial transmission form. Various types of protocols exists and are used in UART communication as defined by various communication standards such as Electronic Industries Alliance standards RS-232, RS-422 or RS-485.

SUMMARY

There exists a need to provide a universal asynchronous receiver-transmitter interface operable to support a plurality of automated protocols.

A universal asynchronous receiver/transmitter (UART) interface is disclosed. The UART interface may include a configurable asynchronous receiver and transmitter unit; and a configurable state machine, wherein the state machine allows configuration of the receiver and transmitter unit to support various baud rates and provide for start bit and stop bit configuration, wherein the state machine is further configurable to automatically support a plurality of communication protocols.

In some embodiments, the plurality of communication protocols may include a DMX protocol. In the same or alternative embodiments, the plurality of communication protocols may include a DALI protocol. In the same or alternative embodiments, the plurality of communication protocols may include a LIN protocol.

In some embodiments, an operating mode is set through a configuration register. In some embodiments, the state machine provides automatic support for a break, MAB, frame width, MTBF and MTBP.

In some embodiments, a microcontroller system is also disclosed. The microcontroller system may also include a microcontroller including the UART. In such embodiments, the microcontroller may be selected from a group consisting of: an 8-bit microcontroller, a 16-bit microcontroller, and a 32-bit microcontroller. In such embodiments, the microcontroller may further include a timer coupled to the UART interface.

In some embodiments, the operating mode may include a Manchester mode.

DETAILED DESCRIPTION

Figure 1:
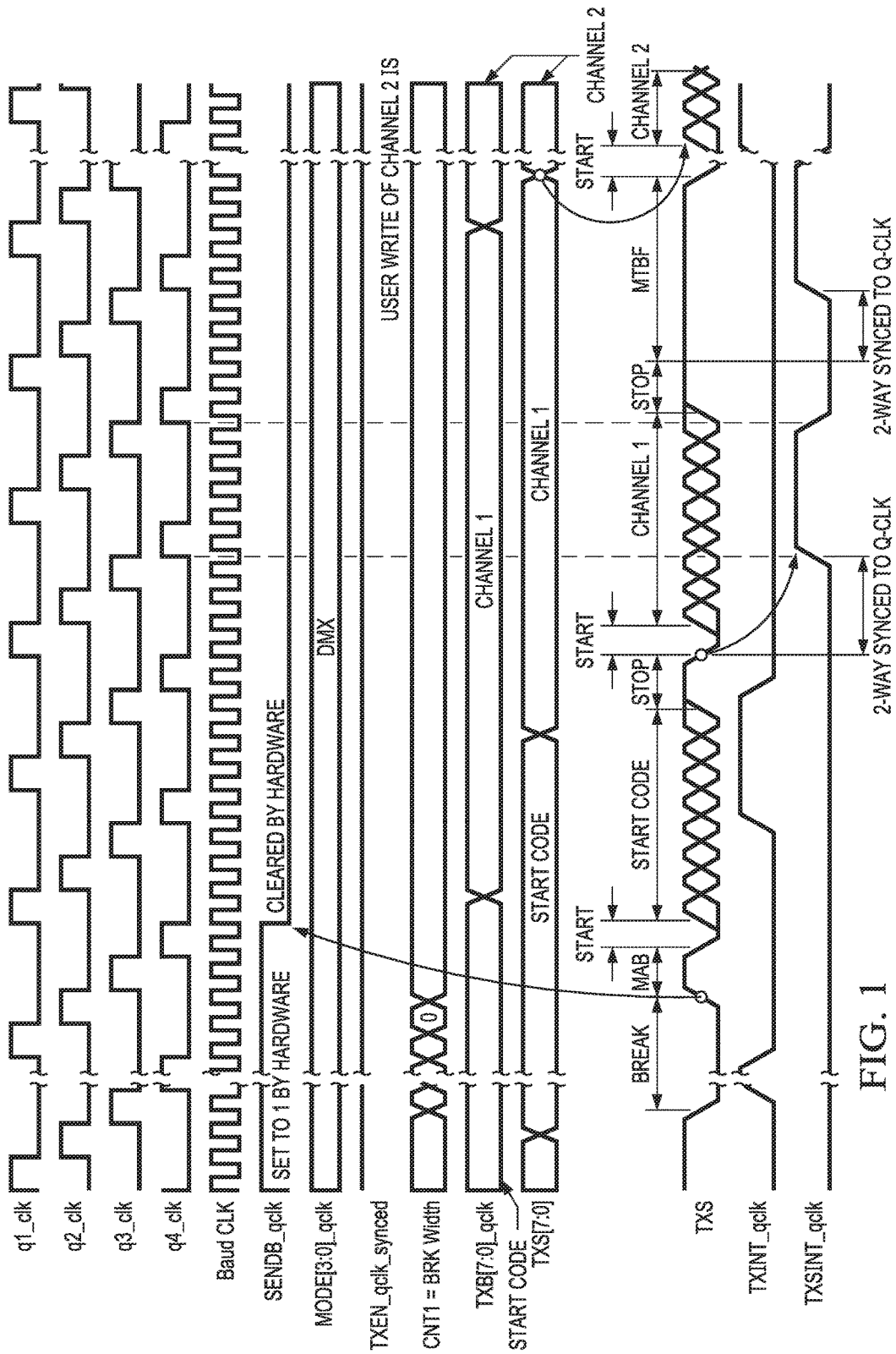
FIG. 1 illustrates an example transmission of the first through 512th byte, in accordance with certain embodiments of the present disclosure.

According to various embodiments, a universal asynchronous receiver/transmitter ("UART") can be provided that allows multi-step protocols such as Digital Multiplex ("DMX"), Local Interconnect Network ("LIN"), Digital Addressable Lighting Interface ("DALI"), etc. to be implemented using just data interactions. There is no need for software to worry about where to place a break ("BRK") character, START bit, STOP Bit, Checksum etc. All the physical layer placement of these elements may be taken care of automatically. Software may only be responsible for reading and writing data over the link.

In each protocol, a user may write and read the data to be transmitted or received. For the purposes of this disclosure, a "user" may refer to any appropriate electronic device and/or operator of said device. The UART may then automatically insert START, STOP, IDLE periods, Checksum calculation, Data Insertion, Parity bits, etc. Thus, at least the following protocols can be implemented: Automatic DMX protocol, Automatic DALI protocol, Automatic LIN protocol.

Certain conventional UARTs may only provide relatively low-level control of bits. Higher-level issues (e.g., where to place the START and STOP bit(s), Checksum, etc.) are taken care of in software because most microcontrollers have plenty of software cycles available. However, on smaller solutions, such as an 8-bit microcontroller, the total available software cycles are lower, so hardware blocks may be leveraged to take the load off the software.

According to various embodiments, a general protocol software setup may be provided. For example, a plurality of bits may be provided that allow a user to select one of a plurality of available protocol modes. This may be accomplished, for example, by setting a control bit in a UART configuration register, e.g., USE_PROT=1. Further, a baud rate value (e.g., a baud rate generator bit "BRGH/L") can be set up so that a required clock rate can be divided out of a selected clock. These clock rates are provided as examples only. Hardware may not enforce any limits on the clock rate. Clock rates may be provided for different protocols, for example, DMX may use a clock rate between 5-250 KHz, DALI a clock rate from 2180-2666 Hz (which translates to Manchester 1090-1333 baud at the pin), and LIN a clock rate from 100 Hz-20 KHz.

In some embodiments, a watermark value may be set up to the required watermark. For example, if an interrupt is desired when the Transmit first-in-first-out ("FIFO") reaches 3, a particular configuration may set TINTFLG[2:0] to 3. Other configuration values may be also be used without departing from the scope of the present disclosure. For example, logic levels on appropriate signal pins can be set up to the desired value, depending on the protocol; a transmit polarity bit may be set; a model selection signal may be set to a desired mode; a transmit-enable signal may be set; a receive-enable signal may be set; etc.

In some embodiments incorporating a protocol that have BRK (e.g., DMX and LIN), if a BRK is received in the middle of a packet (unexpected early BRK) the state machine will behave as if a new packet has started. Contents of receive buffers will not be flushed; the user must read these out or purposefully flush the buffer content (e.g., by activating the RXFLSH bit).

In some embodiments, checksum values, parity internal adders (and any of its working registers) are cleared at the beginning of all protocol modes. The Checksum and Parity Status bits, however, are not cleared. These may be cleared by the user according to some embodiments.

DMX Protocol State Machine

In various embodiments, the UART with automated protocol may take advantage of a DMX protocol. In such embodiments, the particular protocol may be chosen by a plurality of bits that allow a user to select one of a plurality of available protocol modes. For example, a particular configuration may select the DMX protocol by setting a "USE_PROT" signal to a logic high. DMX is a protocol used in Stage and Show Equipment. This includes Lighting, Fog Machines etc. The protocol consists of a Control console that sends out commands, and Equipment such as Theater Lights that receive these commands. The protocol is one-way, with the Console transmitting commands and the Equipment receiving them. Equipment never transmits anything and Consoles never receive anything. Also, DMX configurations do not include error controls or re-transmit mechanisms.

DMX, or DMX-512 as it may also be known, consists of a "Universe" of 512 channels. This means that one Console can output up to 512 bytes on a single DMX link. Each Equipment on the line is programmed to listen to one of more of these bytes. For example, a Fog machine connected to one of the universes may be programmed to receive starting at byte number 10 and receive 4 byte counts, and a lighting unit may be programmed to byte number 22 and receive one byte count.

Each DMX transmission may begin with a BREAK followed by a byte called the 'Start Code'. The width of the BREAK is set up with a particular register, for example the P1 register. Break is followed by a "Make After Break (MAB)". FIG. 1 illustrates an example transmission of the first through 512th byte, in accordance with certain embodiments of the present disclosure. Each byte transmitted will produce an interrupt event when a particular signal, (e.g., USE_FIFO) is set to a particular logic level (e.g., 0). The interrupt frequency may alter when that signal is altered. For example, when the signal is set to the opposite logic level (e.g., 1), the interrupt frequency may depend on the Watermark Setting.

In some embodiments, when the UART is configured as a receiver, the UART may listen for a BREAK character that is of a predetermined length (e.g., at least 11 clocks wide). Immediately after the BREAK the UART will see the MAB. This space may be ignored by the UART. Then the UART will see the Start Code. The Start Code will always be clocked into a particular memory portion of the UART (e.g., the Receive Buffer). The Start Code will always produce an interrupt event regardless of FIFO occupancy. If the interrupt frequency signal is set at a particular logic level (e.g., USE_FIFO=1), the receive interrupt will be flagged according to the Watermark Setting.

Figure 2A:
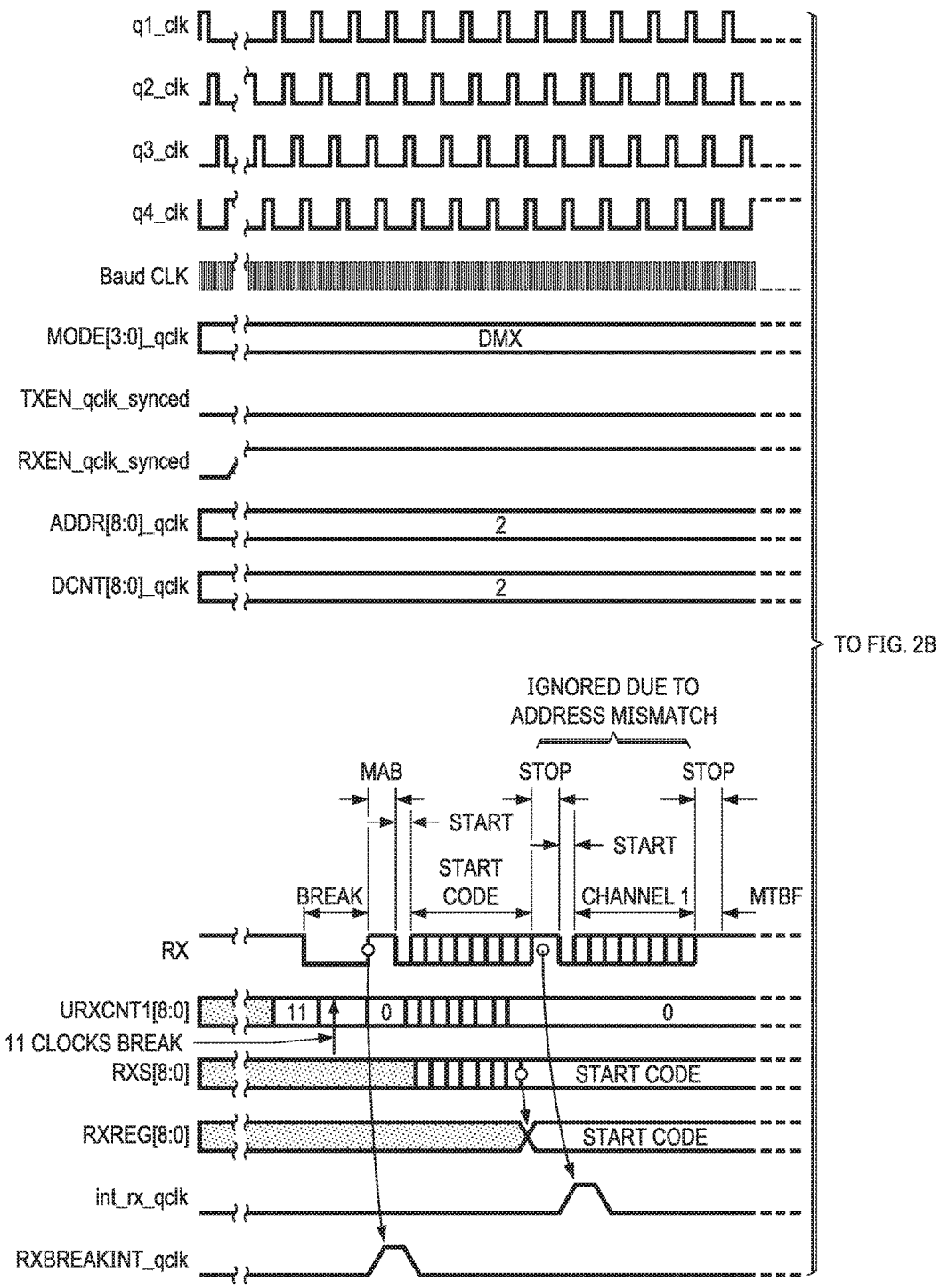
FIGS. 2A and 2B illustrate an example corresponding DMX receive protocol, in accordance with certain embodiments of the present disclosure.
Figure 2B:
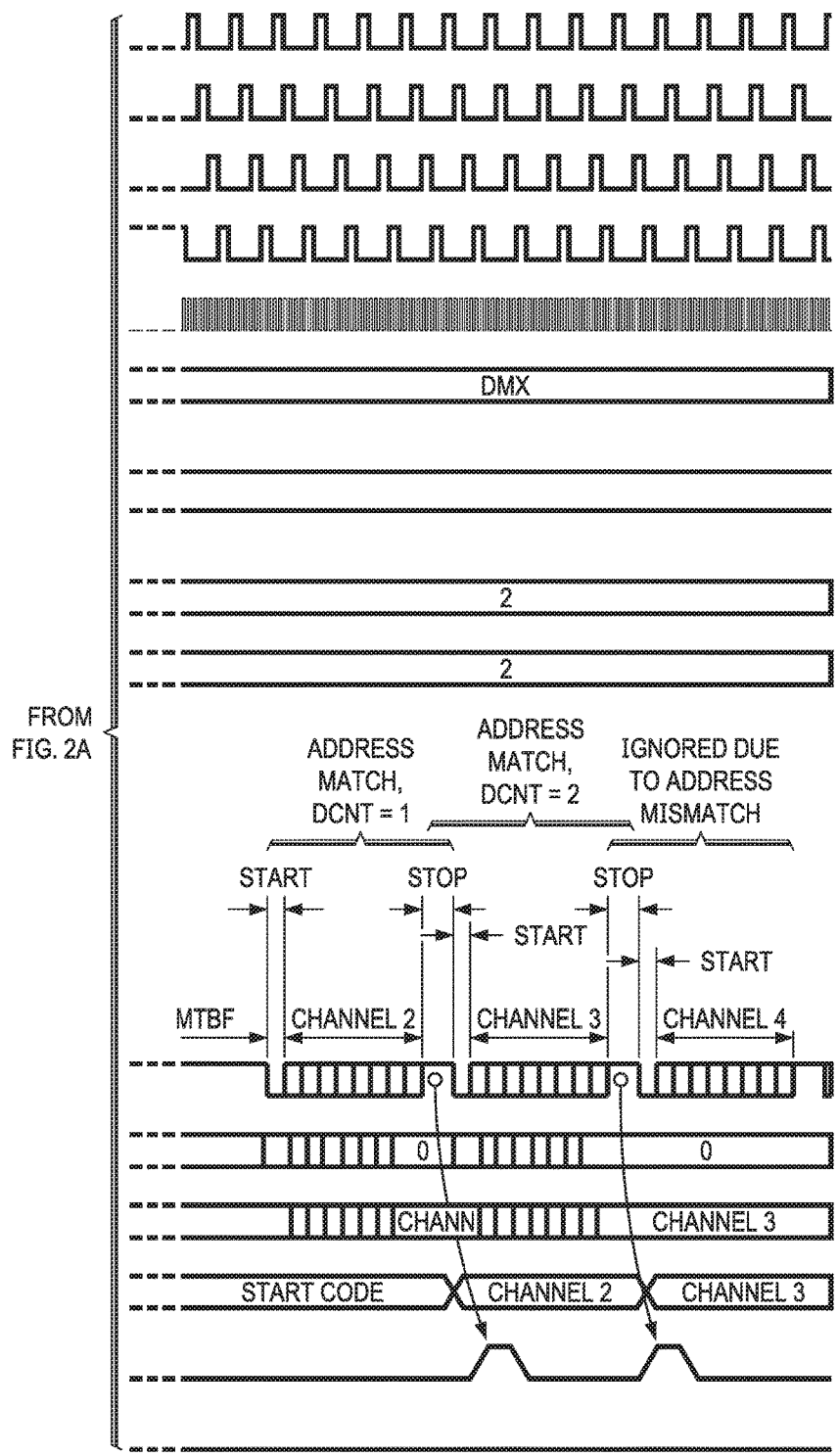

After the Start code, the UART will receive the 1st through 512th byte. Rather than have 512 interrupts for the received bytes, the UART is able to ignore the received bytes until the one that is of interest is received. This is done using other memory portions of the UART (e.g., the P2 and P3 registers). One memory portion (e.g., the P2 register) may hold the value of the byte number to start the receive process. In the case of the Fog Machine listed above, for example, a user may program the P2 register to 10. The Lighting fixture discussed earlier may be programmed to number 22. Another memory portion (e.g., register P3) may hold the value for the number of bytes to receive. In the case of the Fog Machine, the other memory portion (e.g., P3) would hold value 4 so that the UART will receive bytes 10, 11, 12 and 13, a total of 4 bytes. FIGS. 2A and 2B illustrate an example corresponding DMX receive protocol, in accordance with certain embodiments of the present disclosure.

Transmit Software Model

In various embodiments, the UART with automated DMX protocol may also include a transmit software model. The transmit software model may be set up by asserting a particular signal. For example, a pin signal (e.g., P1H/L) may be set to a desired duration for the transmitted BREAK. A typical value is 13.

In some embodiments, the model may then write the Start Code into a communication bus (e.g., TXB[7:0]). This may make the UART transmit the BREAK when the first word is written into the FIFO. The BREAK may last for the desired duration (e.g., by the number of clock counts set on 'P1H/L'). The UART may then write the remaining Channels into the communication bus (e.g., TXB[7:0]). After the start code, the next channels are transmitted out of the bus FIFO. A transmission interrupt signal (e.g., int_tx) may be set whenever the Watermark is reached (e.g., USE_FIFO=1) or when the bus is full (USE_FIFO=0).

If any of the remaining channels are not written, the transmission output may go high and stay high until more bus contents become available. This may result in a transmission timer rest signal (e.g., uart_timer_reset_tx) from not toggling until more space on the bus is made available. An external Timer, such as Timer 2, may count the time between this toggle to determine whether or not the DMX connection has timed out. If it has, the software may alternate a transmission enable signal (e.g., by setting TXEN=0 and then TXEN=1) in order to restart the transmit state machine. This will also flush the bus. In some embodiments, the UART may automatically handle the MAB and 2-STOP Bits.

Receive Software Model

In various embodiments, the UART with automated DMX protocol may also include a receive software model. The receive software model may be set up by asserting a particular signal. For example, a first pin signal (e.g., P2H/L) may be set to a desired byte count to start receiving data. Additionally, a second pin signal (e.g., P3H/L) may be set to a desired count of bytes to receive starting at the first pin signal. In some embodiments, the UART may wait for a BREAK to appear on the line. When it does, the sampling clock may be synchronized.

In some embodiments, the first byte received is the START code and is always loaded into the FIFO. A receive watermark interrupt signal (e.g., int_rx) is always flagged when the START code is received regardless of Watermark/FIFO setting. Starting from the byte after the Start code, the byte count (address) is specified by the first pin signal is matched. Once matched, the value on the second pin signal may be loaded into the FIFO. A receive watermark interrupt signal (e.g., int_rx) may be set the interrupt whenever the Watermark is reached. If the receive line is idle for more than a predetermined time (e.g., one second), the DMX link may be considered dead. An external timer may be used to time this predetermined time if the UART does not have a timer large enough to count to the predetermined time.

DALI Protocol State Machine

In various embodiments, the UART with automated protocol may take advantage of a DALI protocol. In such embodiments, the particular protocol may be chosen by a plurality of bits that allow a user to select one of a plurality of available protocol modes. For example, a particular configuration may select the DALI protocol by setting a "USE_PROT" signal to a logic high. DALI is a protocol used to control lighting in large buildings such as offices and factories. It consists of two modes: "Devices" and "Gear." A "Device" is the main controller that sends out commands to the lighting fixtures. The lighting fixture itself is known as "Gear." All bit transmission may be done in Manchester Encoding, which is done by the hardware. The DALI wire is half-duplex; the transmit and receive lines are electrically tied together through an AC transformer.

Figure 3A:
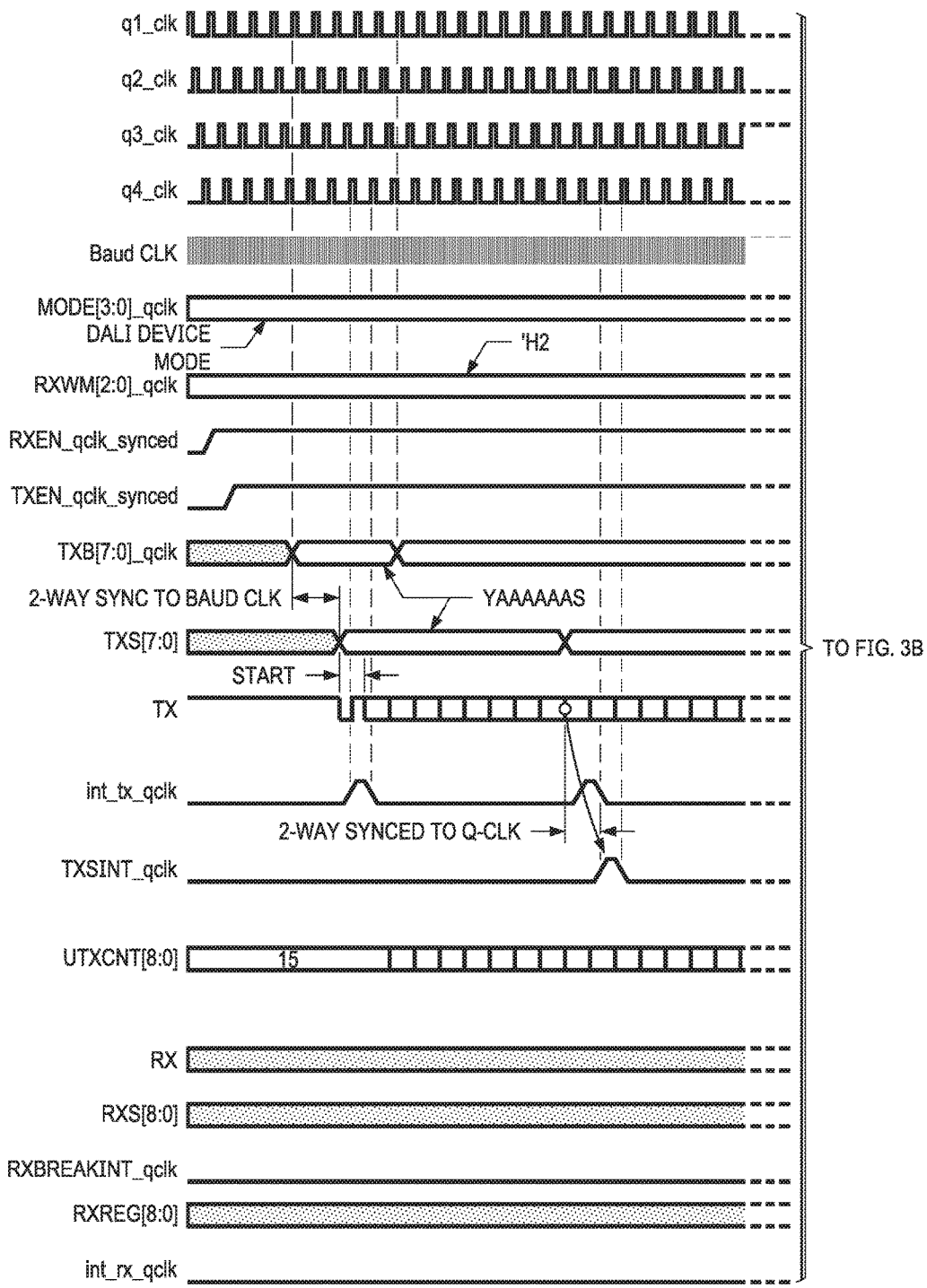
FIGS. 3A and 3B illustrate an example 16-Bit DALI device with a memory portion set to a particular data size (e.g., register P1=2 (Bytes)), in accordance with certain embodiments of the present disclosure.
Figure 3B:
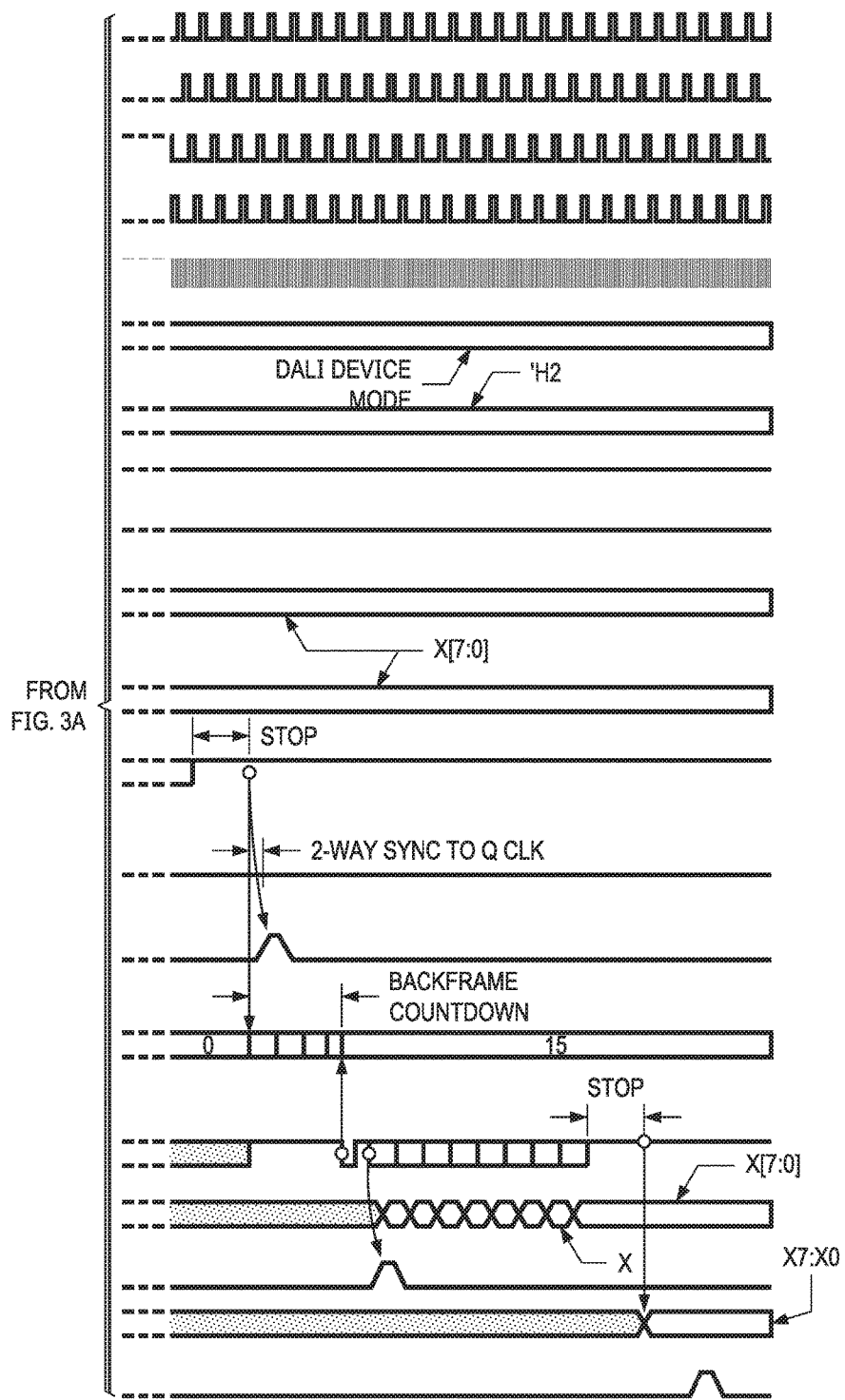

Unlike all other protocols, DALI is transmitted most significant bit ("MSb") first. The UART transaction may begin when the "Device" starts a transmission. A Device transmission consists of 2 Bytes in DALI 1.0 and 3 Bytes in DALI 2.0. The first one is a control byte designated by 'YAAAAAAS' followed by one or two data bytes. These bytes coming out of the Device is called a "Forward Frame". FIGS. 3A and 3B illustrate an example 16-Bit DALI device with a memory portion set to a particular data size (e.g., register P1=2 (Bytes)), in accordance with certain embodiments of the present disclosure. Each byte transmitted will produce an interrupt event when USE_FIFO=0. When USE_FIFO=1, the interrupt frequency may depend on the Watermark Setting. In some configurations, a device that has set USE_FIFO=0, it may not be possible to write three words back to back, because only one transmission bus (e.g., "TXB") and one shifter may be available. Therefore, when writing code for DALI 2.0 Devices, where three bytes must be transmitted, the software must monitor an interrupt signal (e.g., int_tx or TXBE/TXBF) and an interrupt collision signal (e.g., TXMTIF). As soon as the transmission bus becomes available and before the shifter becomes empty, the third byte must be written into the bus. This will assure that three bytes are transmitted back-to-back without interruption.

Figure 4:
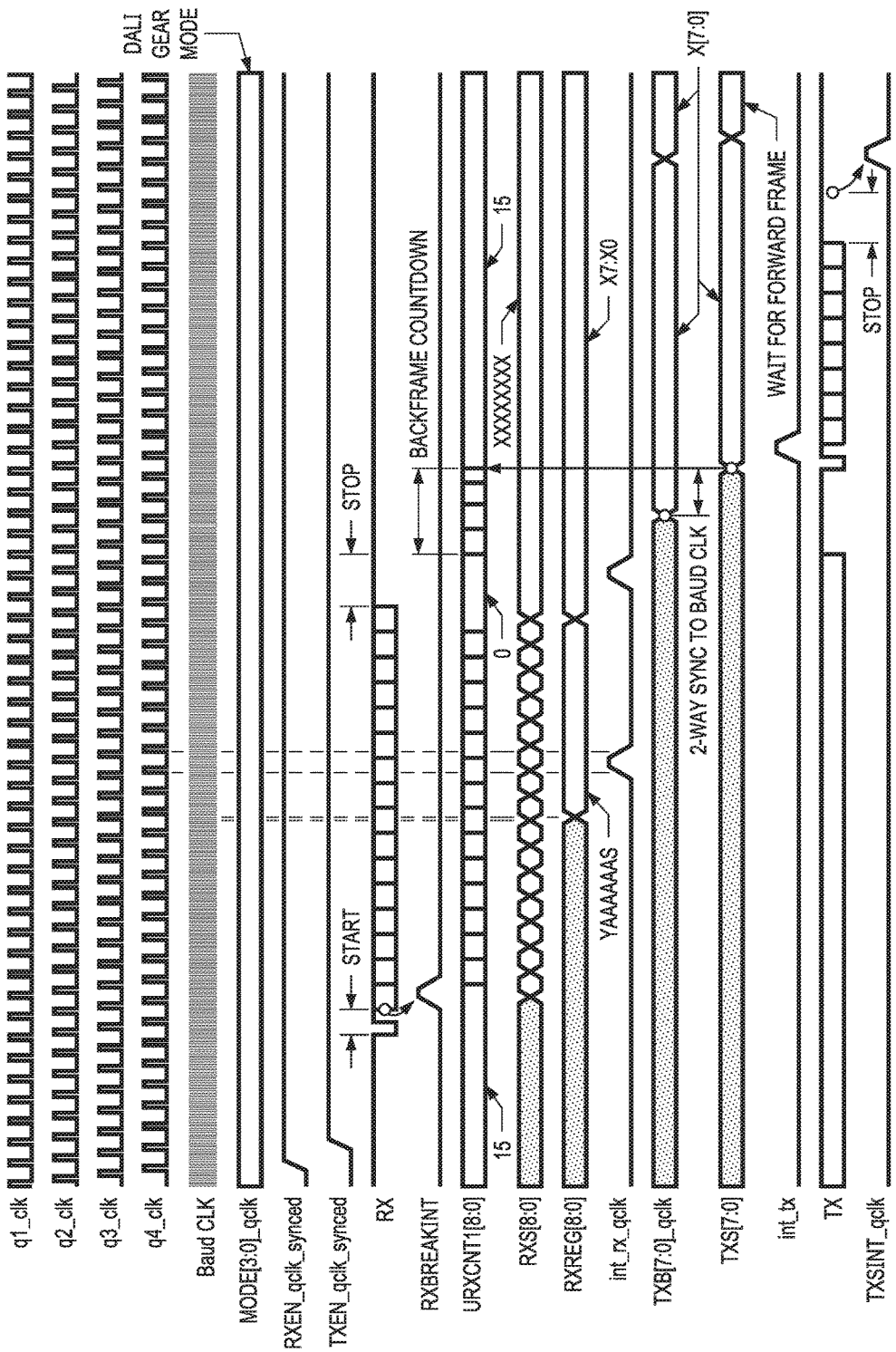
FIG. 4 illustrates an example timing diagram for a DALI transmission, in accordance with certain embodiments of the present disclosure.

All Gear on the line may receive this Forward Frame. One of the Gear may respond to this with a single byte in reply, called 'Back Frame'. The DALI protocol requires that this Back frame must begin to be received within eleven Baud Clock cycles. If the start of a Back frame is received, the Device is required to wait another eleven clock cycles after the end of the Back Frame. After this time, the Device is free to transmit another Forward Frame. FIG. 4 illustrates an example timing diagram for a DALI transmission, in accordance with certain embodiments of the present disclosure. Each byte received will produce an interrupt event when USE_FIFO=0. If USE_FIFO=1, the receive interrupt will be flagged according to the Watermark Setting.

When in DALI mode, the UART must make sure that both STOP bits are correctly received before the current byte is considered a valid receive. If either STOP bit is not correctly received, the receive byte is discarded before transferring from the shifter to the RXB. The UART hardware will detect the required number of STOP bits and respond with an error to the user if that number is not detected.

DALI Device Software Model

In various embodiments, the UART with automated DALI protocol may include a device software model. The device software model may be set up by asserting a particular signal. For example, a pin signal (e.g., P1H/L) may be set to a desired number of clock cycles between Forward Frames. Typically, this value will be eleven or greater. The UART may then transmit data (e.g., on X[7:0] immediately following YAAAAAAS. Therefore both bytes must be available before transmission can begin. The UART may then write the value of YAAAAAAS' header into a portion of the transmission bus (e.g., TXB[7:0]). Since this is the first write into the bus, it may immediately be copied into the transmission shifter, freeing up one location on the bus.

The UART may then write the value of the data byte from the transmit data (e.g., on X[7:0]) onto the transmission bus (e.g., onto TXB[7:0]). If a 24-bit DALI 2.0 transmission is desired, a third byte must be written into the bus before the transmission shifter becomes empty. If the bus remains empty, a transmission line may go high and stay high. The UART may then assert a transmission timer reset signal (e.g., uart_timer_reset_tx output). In some embodiments, an external Timer may be used to monitor for timeout. If it has, the software must toggle a transmission enable signal (e.g., by setting TXEN=0 and then TXEN=1) in order to restart the transmit state machine. The software may also choose to flush the transmission bus.

After the first frame, the UART may wait for the number of clocks between frames specified on the pin signal (e.g., P1H/L). During this time, the transmission output is held high. For DALI, this value is eleven, which will make the UART wait for eleven clocks to wait for a Back Frame. The UART may then transmit the next channels out of the transmission bus FIFO. A transmit watermark interrupt signal (e.g., int_tx) may trigger an interrupt whenever the Watermark is reached. In some embodiments, the UART may make sure that a Header-Data byte pair is present before starting transmission for each Frame. In some embodiments, the UART may automatically generate Manchester timing.

DALI Gear Software Model

In various embodiments, the UART with automated DALI protocol may include a gear software model. The gear software model may be set up by asserting a particular signal. For example, a pin signal (e.g., P1H/L) may be set to a desired maximum number of clock cycles after Forward Frames to start a Back Frame. Typically, this value must be less than eleven (e.g., twenty-two half-bit times). When the UART is set into Gear mode, the UART may begin listening for a Received Forward Frame. This is needed because a Forward Frame must be received before a Back Frame is transmitted. When a Forward Frame is received, it is processed by the Application software. The value of the Back frame is written into a portion of the transmission bus (e.g., TXB[7:0]).

When the portion of the bus is not empty, the UART may ensure that fewer than the desired maximum number of clock cycles after the Forward Frame has passed. If the bus word is made available before this time expires, it is transmitted as a Back Frame. If more than that has passed, the content of the shifter is discarded. The word will be transferred from the bus into the transmission Shifter, but it will not be transmitted. For the next Back Frame, a new bus word must be written onto the bus by the user.

After the first frame, the UART may wait for another Forward Frame. During this time, the transmission output may be held high. The UART may then transmit the next channels out of the bus FIFO when the next Forward Frame is received. The transmit watermark interrupt signal (e.g., int_tx) may trigger an interrupt whenever the Watermark is reached.

LIN Protocol State Machine

In various embodiments, the UART with automated protocol may take advantage of a LIN protocol. In such embodiments, the particular protocol may be chosen by a plurality of bits that allow a user to select one of a plurality of available protocol modes. For example, a particular configuration may select the LIN protocol by setting a "USE_PROT" signal to a logic high. LIN is a protocol used in Automotive Applications. The LIN network consists of two kinds of software processes: a "Master" process and a "Slave" process. Each network only has one Master process and has one or more Slave processes. The Master process resides on one processor UART. All the other UARTs on the network are driven by Slave Software processes. From a physical layer point of view, the UART macro on one processor may be driven by both a Master and a Slave process, as long as only one Master process exists on one network.

In some embodiments, the UART begins when a Master process starts a transmission by transmitting a Break, followed by a Delimiter bit, followed by a Sync Field and protected identification ("PID") byte. The PID determines which Slave Process is expected to respond to the Master. After the PID byte is an Interbyte Space, whose length is set by a memory portion of the UART (e.g., the P3 register). Before the Interbyte Space expires, one or more of the Slave processes may respond to the Master Process. If no one responds within the Interbyte Space, the Master is free to start another transmission.

The Slave Software process may drive the same UART as the Master, or may reside on another UART or another processor device altogether. The Slave Process starts by waiting for a Master Frame. If the PID matches, the Slave process responds by either doing nothing, or by transmitting the required response. In some embodiments, up to eight bytes may be transmitted by the slave. At the end of those bytes, the Slave UART automatically calculates the Checksum for the transmitted words, and transmits it as a data byte at the end of those bytes (e.g., at the 9th data byte), which completes the LIN transaction. The Checksum may be calculated by adding additional bits (e.g., eight bits) at a time and adding the carry bit to the result. This Checksum may then be transmitted with the transmission data.

When data is received by the receiving UART, the Checksum is calculated using the same algorithm. The next byte (e.g., the ninth byte), which is the checksum value calculated by the transmitter is inverted and added to the locally calculated checksum. For example, if the result is all '1's, then the checksum has passed. Table 1 below illustrates an example taken from the LIN 2.2A specification. Table 1 uses the example values for the four data bytes involved in the calculation are 0x4A, 0x55, 0x93, 0xE5.

TABLE 1

| Action | hex | Carry | D7 | D6 | D5 | D4 | D3 | D2 | D1 | D0 |
|---|---|---|---|---|---|---|---|---|---|---|
| 0x4A | 0x4A | | 0 | 1 | 0 | 0 | 1 | 0 | 1 | 0 |
| +0x55 | 0x9F | | 1 | 0 | 0 | 1 | 1 | 1 | 1 | 1 |
| Add Carry | 0x9F | 0 | 1 | 0 | 0 | 1 | 1 | 1 | 1 | 1 |
| +0x93 | 0x132 | | 0 | 0 | 1 | 1 | 0 | 0 | 1 | 0 |
| Add Carry | 0x33 | 1 | 0 | 0 | 1 | 1 | 0 | 0 | 1 | 1 |
| +0xE5 | 0x118 | | 0 | 0 | 1 | 1 | 0 | 0 | 0 | 0 |
| Add Carry | 0x19 | 1 | 0 | 0 | 0 | 1 | 1 | 0 | 0 | 1 |
| Invert | 0xE6 | | 1 | 1 | 1 | 0 | 0 | 1 | 1 | 0 |
| Receiver Verification | | | | | | | | | | |
| Check Local + Received | 0x19 + 0xE6 | | 1 | 1 | 1 | 1 | 1 | 1 | 1 | 1 |

In some embodiments, two kinds of Checksum may be available: Legacy and Enhanced. In legacy checksum, only data bytes D0 through D7 are used to calculate checksum. In Enhanced Checksum, data D0 through D7 and PID are included. Which checksum is used in the calculation can be controlled by software using a particular bit (e.g., a C0EN bit).

LIN Transmit Software Model

In various embodiments, the UART with automated LIN protocol may include a transmit software model. The transmit software model may be set up by asserting a particular signal. For example, a pin signal (e.g., P2H/L) may be set to a desired number of bytes to transmit. In some embodiments, in a Master/Slave LIN mode, the Master Process may load a value (e.g., on P1L[5:0]) for the PID to be transmitted. The slave process may write up to eight bytes to be transmitted into the transmission bus FIFO. In some embodiments, in a Slave-Only mode, the value may be ignored since no PID transmission is needed.

In some embodiments, in a Master Slave Mode, writing the PID value may begin a transmission process. The transmission process may include a Break, followed by a SYNC byte, followed by contents of the loaded value (e.g., from P1L[5:0]). Immediately after the contents, PID values may be calculated by the hardware and transmitted. After this, the UART may check the transmission bus occupancy. If the bus is not empty, that means a Slave process resides on the UART that want to transmit out bytes. The bytes in the bus are transmitted out until the number of transmit bytes stored on the pin signal (e.g., P2H). If the bus is empty, a transmit output (e.g., TXS) may be held high until either the bus is written, or the contents of the loaded value are written, whichever comes first. If the loaded value (e.g., P1L) is written, it is assumed that the Master is starting a new frame, the checksum/parity engine is reset and the whole BREAK-SYNC transmission process starts again.

In some embodiments, in a Slave-only mode, receiving the SYNC 'arms' the UART to transmit bytes. Writing the bus starts the transmission process. If the transmission bus is written before a SYNC is received, the transmission is held off until SYNC completes. The next bytes, if available, are transmitted out of the transmission bus (e.g., TXB[7:0]) FIFO, with an inactive output if the bus becomes empty. This is repeated until the UART transmits the number of bytes from the pin signal (e.g., P2H/L). In some embodiments, a transmit watermark interrupt signal (e.g., int_tx) may trigger an interrupt whenever the Watermark is reached. At the end of the number of bytes from the pin signal (e.g., P2H/L data words), the UART may calculate and transmit a checksum bit (e.g., either checksum 0 (bit C0EN=1) or checksum 1 (bit C0EN=1)). In some embodiments, in a Master/Slave mode, to start a new transmission the contents of the loaded value (e.g., P1L) must be written after the last data is transmitted out. Since writing the loaded value (e.g., P1L) triggers a new packet, writing the loaded value in the middle of a slave transmission will be ignored.

2.14.2 LIN Receive (Slave Only) Only Software Model

In various embodiments, the UART with automated LIN protocol may include a receive software model for certain slave-only modes. The transmit software model may be set up by asserting a particular signal. For example, a pin signal (e.g., P3H/L) may be set to a desired number of bytes to receive. In some embodiments, the UART may wait for a BREAK to appear on the line. When it does, the sampling clock is synchronized with the Sync Frame. A receive interrupt collision signal (e.g., RXBIF) is flagged, checksum and parity calculators are reset. In some embodiments, the first byte received is PID. The receive interrupt (e.g., int_rx) is always flagged when the PID is received regardless of Watermark/FIFO setting. A UART may automatically calculate and verify other values (e.g., P0 and P1). If they disagree, a collision interrupt signal (e.g., PERIF) may be flagged. Incoming bytes are received until the number of bytes from the pin signal (e.g., P3H/L) are received.

In some embodiments, a certain bit (e.g., C0EN) must be set to the correct value before the start bit of the last byte in the packet is received. The receive watermark interrupt signal (e.g., int_rx) will trigger an interrupt whenever the Watermark is reached. When the desired number of data bytes (e.g., from P3H/L) are received, the UART may automatically calculate a check sum (e.g., Checksum 0 or 1) and XOR with the received Checksum to get all 1s. The locally calculated Checksum may be stored in a memory portion (e.g., the UxRXCHK register). The checksum received from the receive input may be stored in the receive bus as if it was data.

Figure 5:
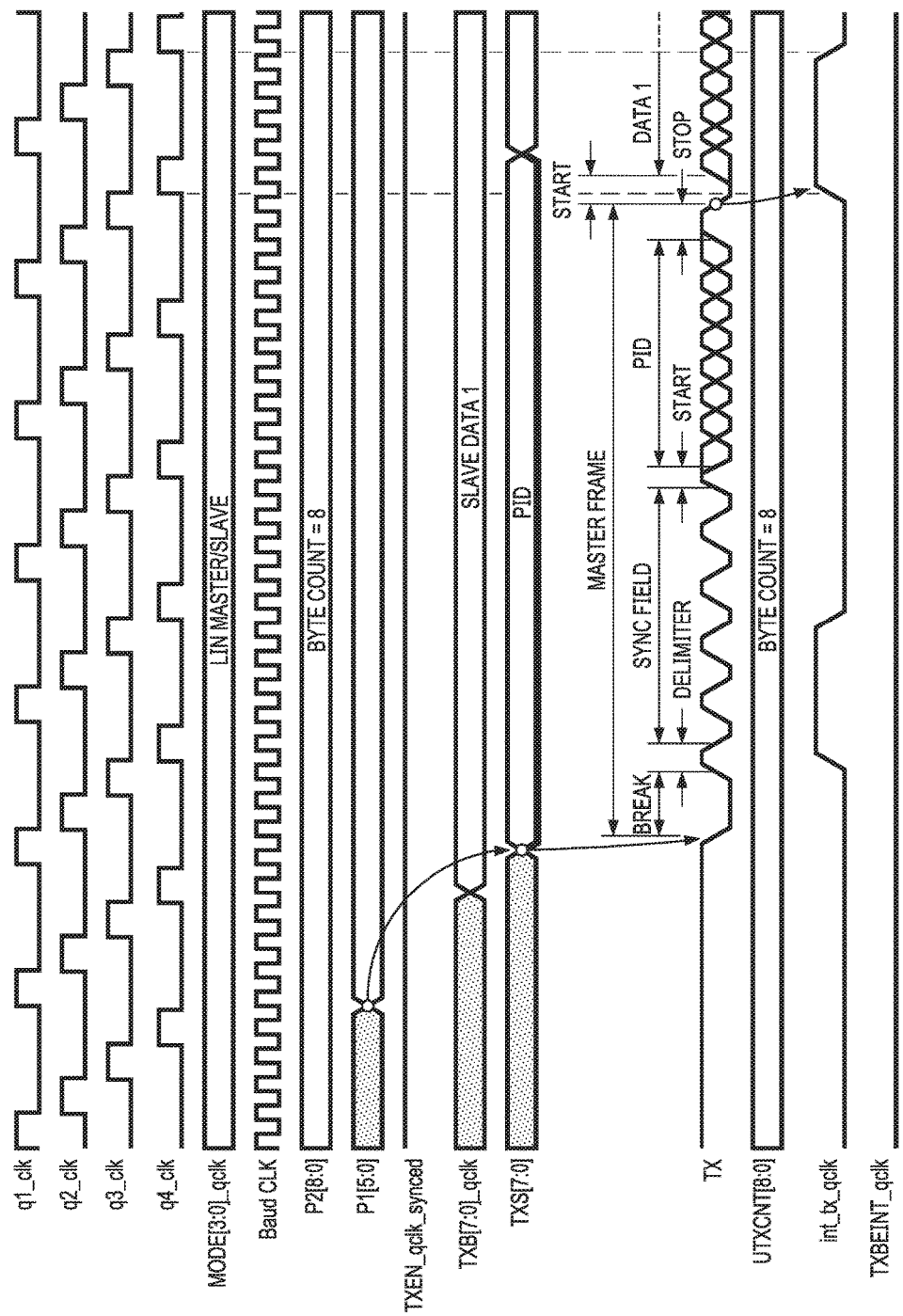
FIG. 5 illustrates an example timing diagram of a LIN master/slave mode, in accordance with certain embodiments of the present disclosure.
Figure 6:
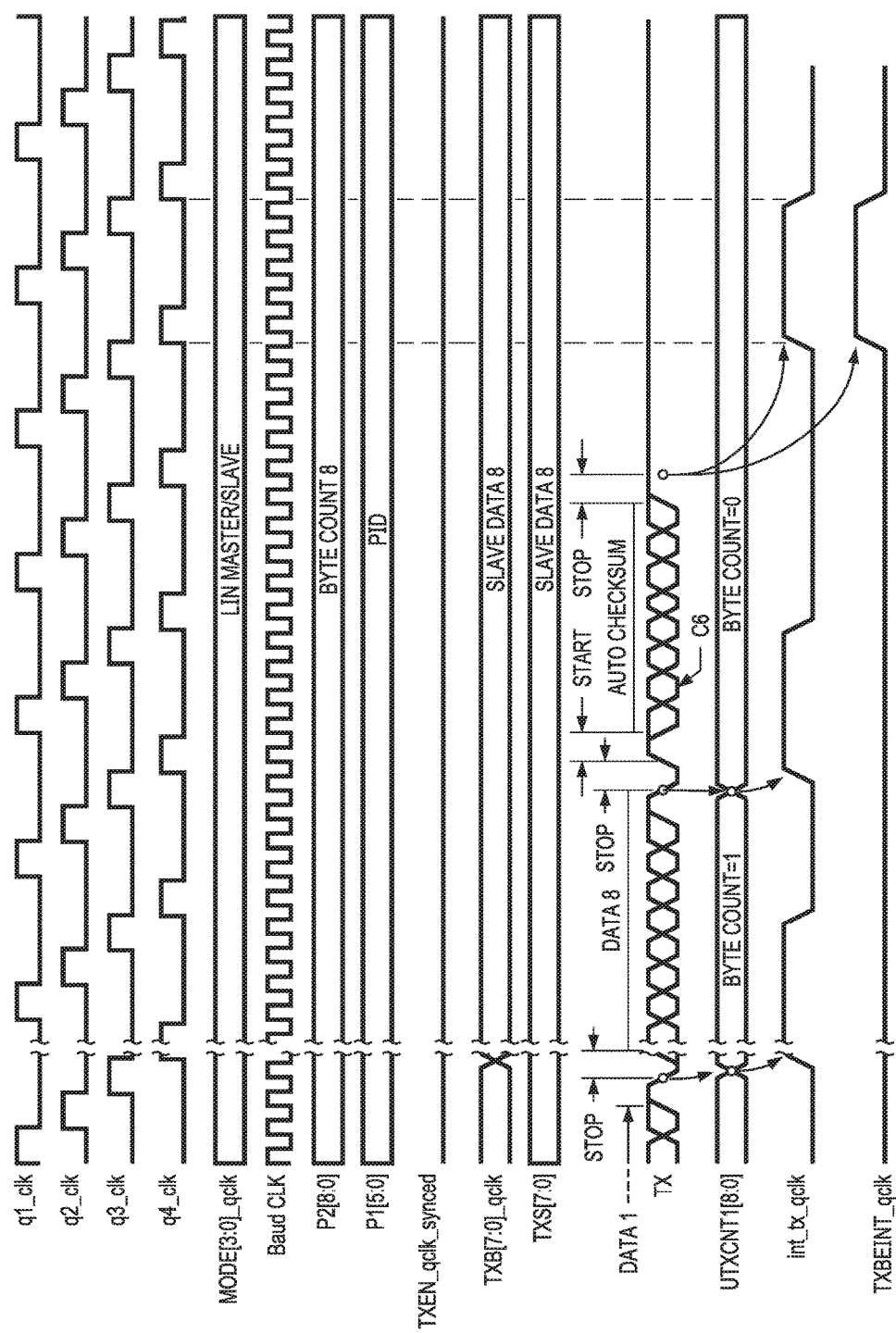
FIG. 6 illustrates a continuing example timing diagram of a LIN master/slave mode, in accordance with certain embodiments of the present disclosure.
Figure 7:
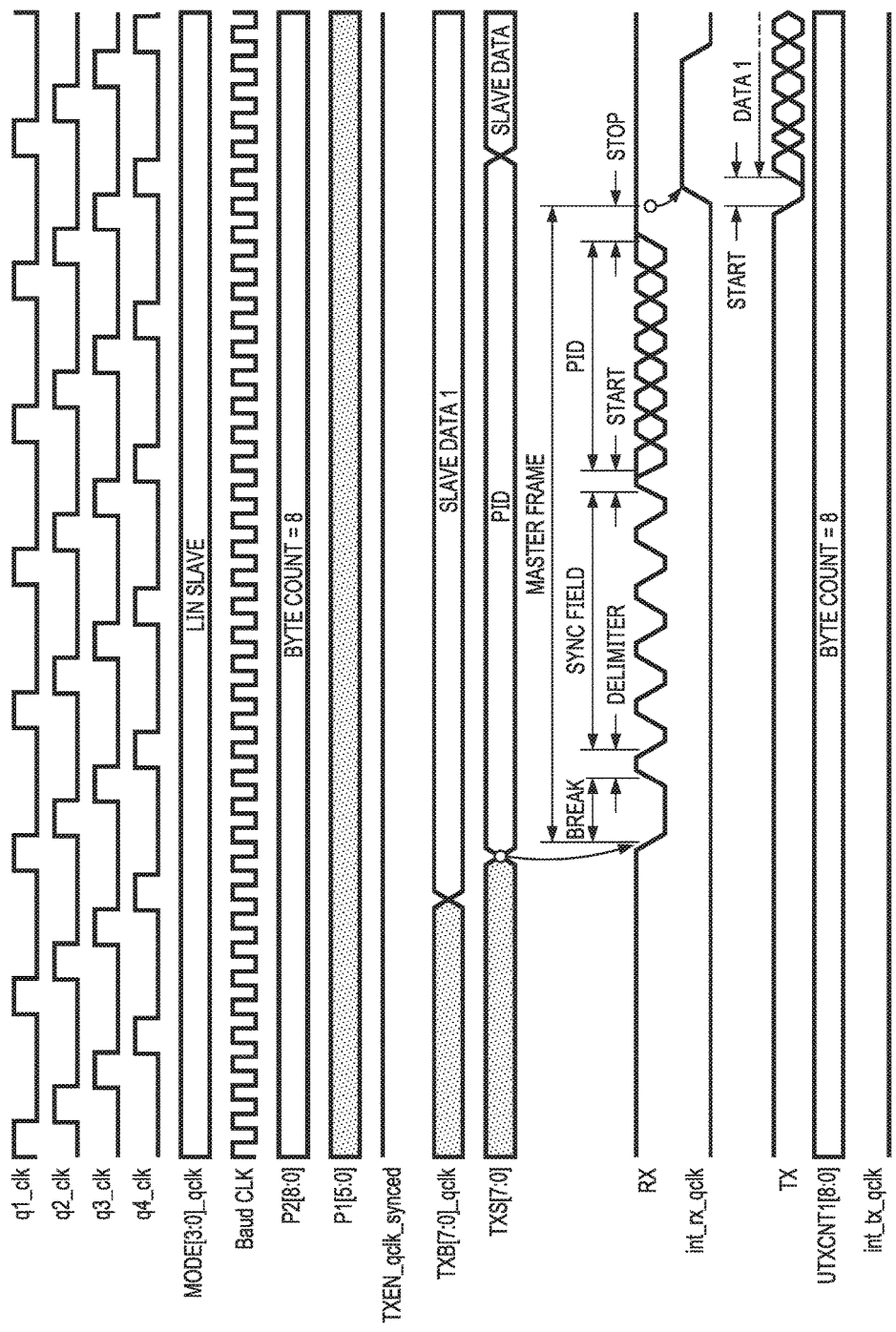
FIG. 7 illustrates an example timing diagram of a LIN slave only mode, in accordance with certain embodiments of the present disclosure.
Figure 8:
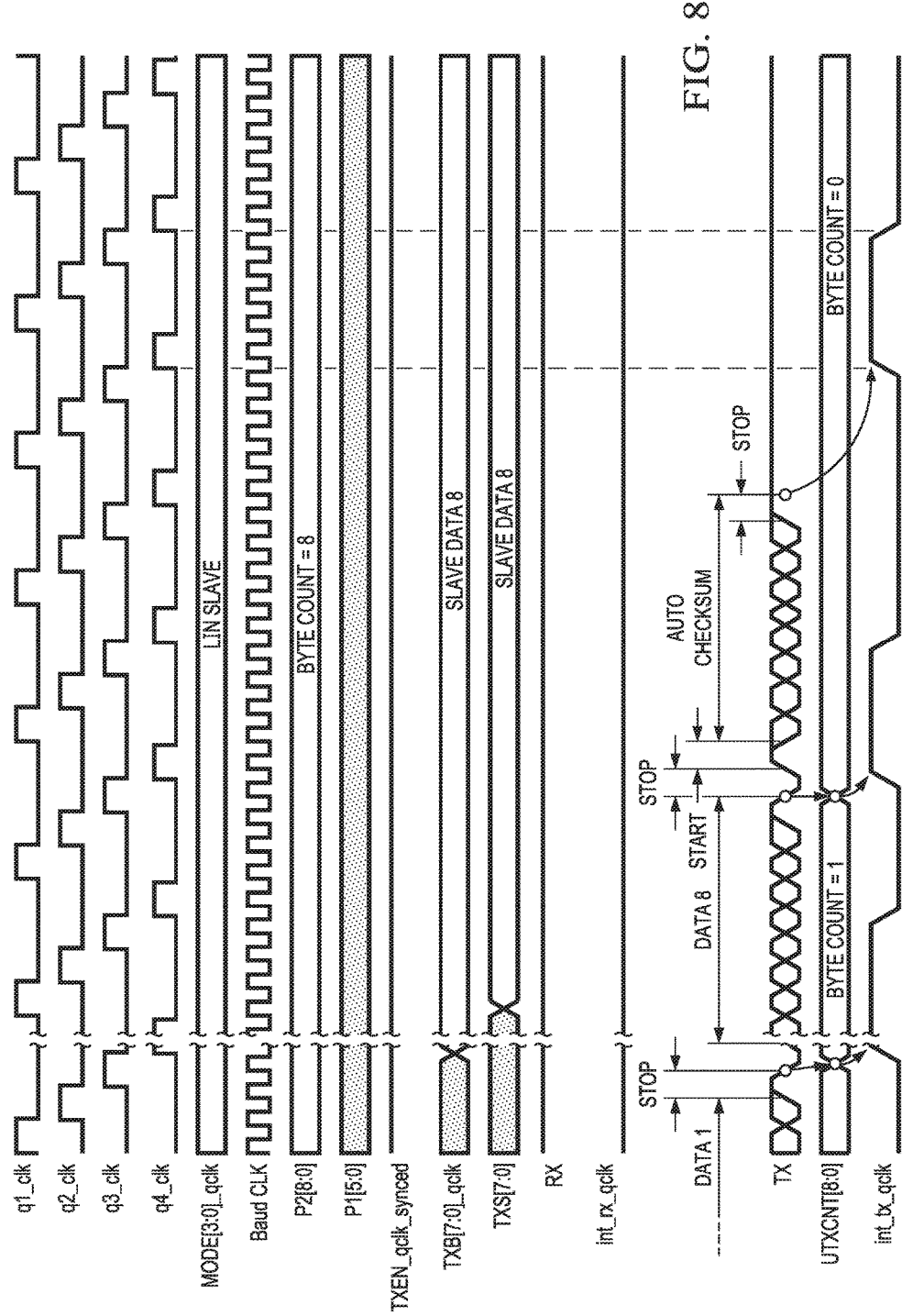
FIG. 8 illustrates a continuing example timing diagram of a LIN slave only mode, in accordance with certain embodiments of the present disclosure.

FIG. 5 illustrates an example timing diagram of a LIN master/slave mode, in accordance with certain embodiments of the present disclosure. FIG. 6 illustrates a continuing example timing diagram of a LIN master/slave mode, in accordance with certain embodiments of the present disclosure. FIG. 7 illustrates an example timing diagram of a LIN slave only mode, in accordance with certain embodiments of the present disclosure. FIG. 8 illustrates a continuing example timing diagram of a LIN slave only mode, in accordance with certain embodiments of the present disclosure.

ASYNC Address Detect Mode

In some embodiments, the UART may operate in an Asynchronous Address Detect Mode. The Asynchronous Address Detect Mode may be used for modes where there are multiple receivers connected to one bus. When a transmitter transmits on this bus, it is useful for every receiver to know whether or not it is being addressed. This allows each receiving UART to eliminate unnecessary interrupts to its CPU.

In some embodiments, each transaction starts with a transmitter transmitting a start bit, with or without a BREAK preceding it. This start bit is followed by a data word. If the data has the ninth bit set to zero, all UARTs will perceive this to be data. When the transmitter transmits a byte with the ninth bit set to one, all receiving UARTs perceive this to be an address. They then may try to match it with the address programmed into a memory portion (e.g., P2) ANDed with the mask in a second memory portion (e.g., register P3). If there is a match, then the data is clocked into the receive buffer. Each byte transmitted and received will produce an interrupt event when USE_FIFO=0. When USE_FIFO=1, the interrupt frequency depends on the Watermark Setting.

Address Detect TX Software Model

In various embodiments, the UART may include an address detect transmission software model. In some embodiments, this model may be set up by setting a MODE signal. For example, MODE may be set to choose Asynchronous 9-bit mode with address detect ('0101'). In some embodiments, the UART may instigate a BREAK transmission. For example, the UART may write a logical one to the SENDB bit. Writing into a memory portion (e.g., P1 register) immediately after the SENDB will cause BREAK to be transmitted. Once BREAK transmission is completed, the SENDB bit may be auto-cleared. This may be followed by an eight-bit value of the memory portion (e.g., P1) to be transmitted. The ninth bit may be automatically transmitted as 1. This is an address transmission. Writing into the transmission bus register immediately after the SENDB will cause BREAK to be transmitted. Once BREAK transmission is completed, the SENDB bit will be auto cleared. This is followed by an eight-bit value of the transmission bus value to be transmitted with the ninth bit automatically transmitted as zero. This is a data transmission. The decision of what to transmit immediately after BREAK depends on whether the memory portion (e.g., P1 register) is written. If both the memory portion (e.g., P1) and transmission bus are written, BREAK followed by the contents of the memory portion (e.g., P1) is transmitted followed by any contents of the transmission bus.

If a BREAK transmission is not desired, the SENDB bit can be ignored, or written to zero. Writing into the memory portion (e.g., P1 register) may cause the eight-bit value of the contents of the memory portion (e.g., P1) to be transmitted with the ninth bit automatically transmitted as one. This is an address transmission. Writing into the transmission bus register will cause the eight-bit value of the transmission bus to be transmitted with the ninth bit automatically transmitted as zero. This is a data transmission. The decision of what to transmit first depends on whether the memory portion (e.g., P1 register) is written. If both the memory portion (e.g., P1) and transmission bus are written, the contents of the memory portion (e.g., P1) are transmitted followed by any contents of the transmission bus.

Address Detect RX Software

In various embodiments, the UART may include an address detect receive software model. In some embodiments, this model may be set up by setting a MODE signal. For example, MODE may be set to choose an Asynchronous nine-bit mode with address detect (0101'). In some embodiments, the UART may set up a first memory portion (e.g., P2) with the address to match. In some embodiments, a second memory portion (e.g., P3) may be set as an address mask. To receive all addresses, for example, write a '0000

0000' to P3. (Received Address XOR P2) AND P3=0000 0000 means 'Address Match'.

When an address match occurs, the raw received address is loaded into the received FIFO. Any data (an eight-bit byte with the ninth bit set to zero) that follows is then loaded into the receive FIFO. This process continues until another address (e.g., an eight-bit byte with the ninth bit set to one) that mismatches with the contents of the first memory portion (e.g., P2) is received.

ASYNC Manchester Mode

In various embodiments, the UART with automated protocol may take advantage of an asynchronous Manchester protocol. In such embodiments, the particular protocol may be chosen by a plurality of bits that allow a user to select one of a plurality of available protocol modes. For example, a particular configuration may select the Manchester protocol by setting "USE_PROT" to a logic high. This mode is the generic UART connection mode, except that all the bits are Manchester-encoded by hardware. The same hardware used in DALI mode may be re-used here.

In some embodiments, the user may write transmit words into the transmission bus (e.g., TXB<7:0>) in the transmit direction. A low-to-high start bit, followed by the contents of the bus may then be transmitted. In the receive direction, as each word is received, it is loaded in to the receive bus (e.g., RXB<7:0>) and decoded from the incoming Manchester. Each byte transmitted and received will produce an interrupt event when USE_FIFO=0. When USE_FIFO=1, the interrupt frequency depends on the Watermark Setting.

Figure 9:
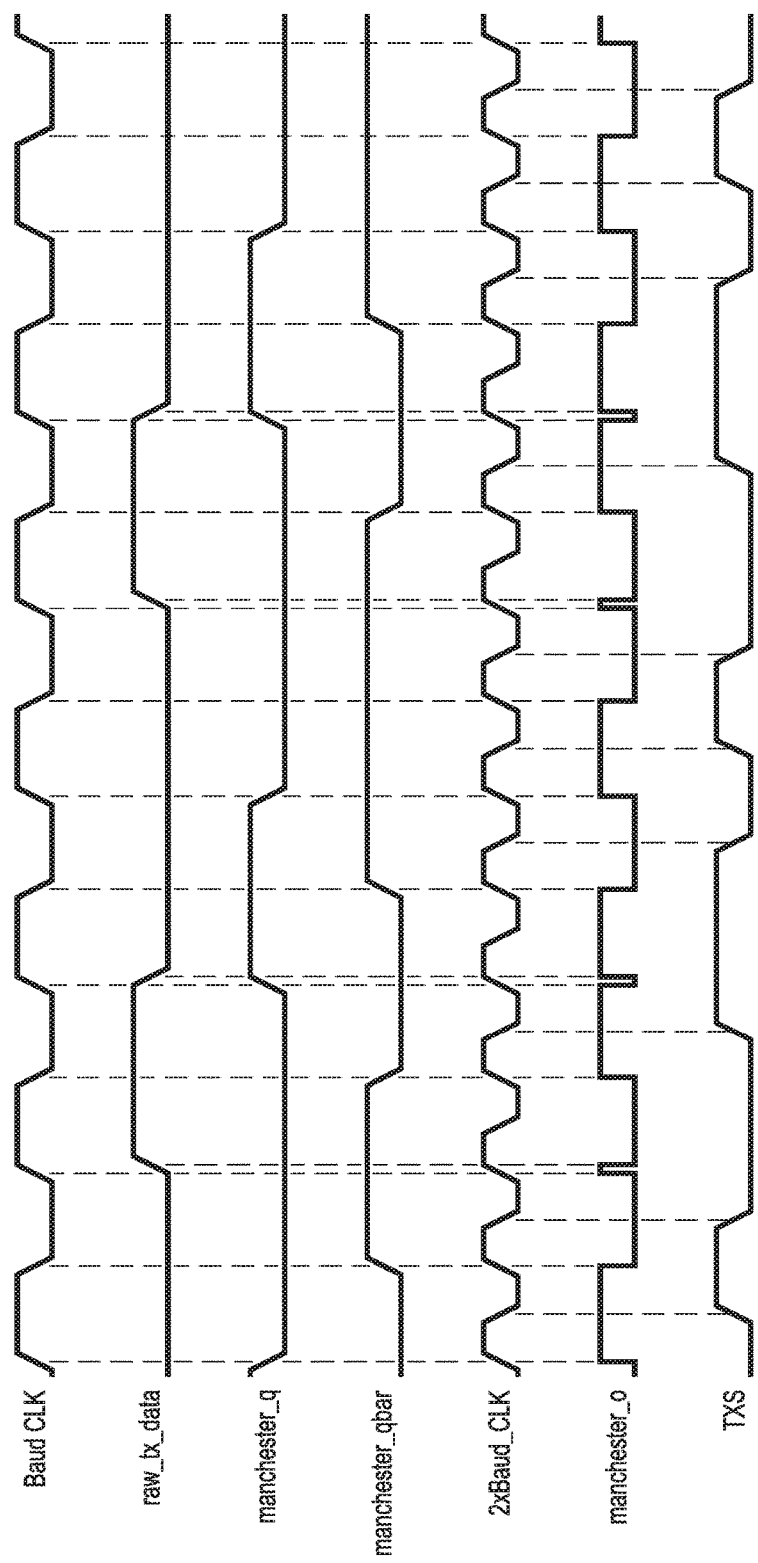
FIG. 9 illustrates an example Manchester decoding scheme for transmission, in accordance with certain embodiments of the present disclosure.
Figure 10:
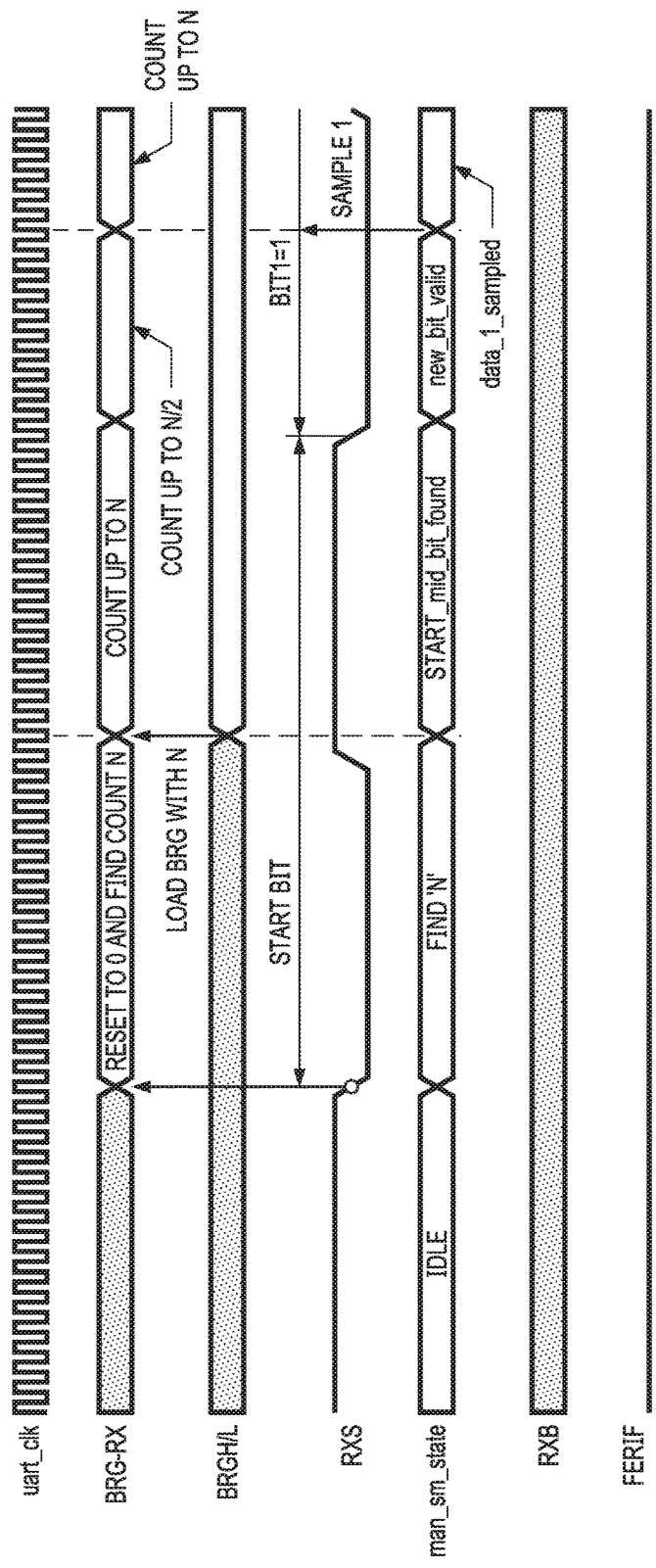
FIG. 10 illustrates an example Manchester decoding scheme for receiving, in accordance with certain embodiments of the present disclosure.
Figure 11:
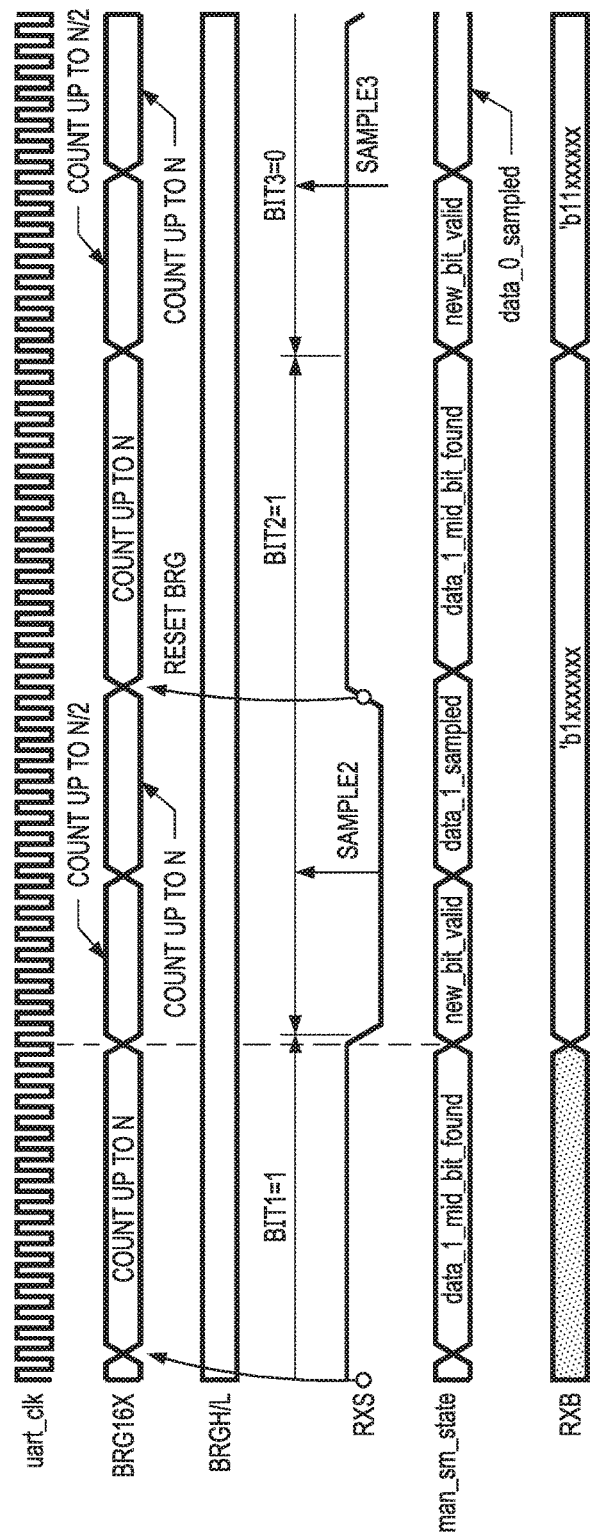
FIG. 11 illustrates a continuing example Manchester decoding scheme for receiving, in accordance with certain embodiments of the present disclosure.
Figure 12:
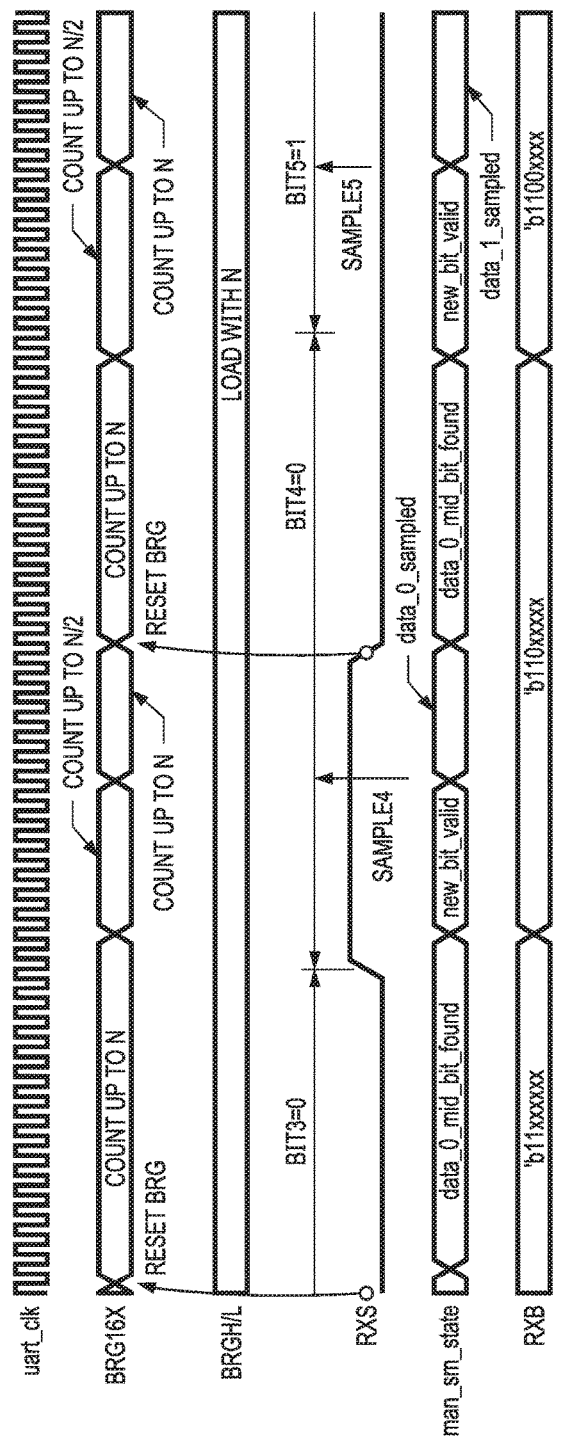
FIG. 12 illustrates a further continuing example Manchester decoding scheme for receiving, in accordance with certain embodiments of the present disclosure.
Figure 13:
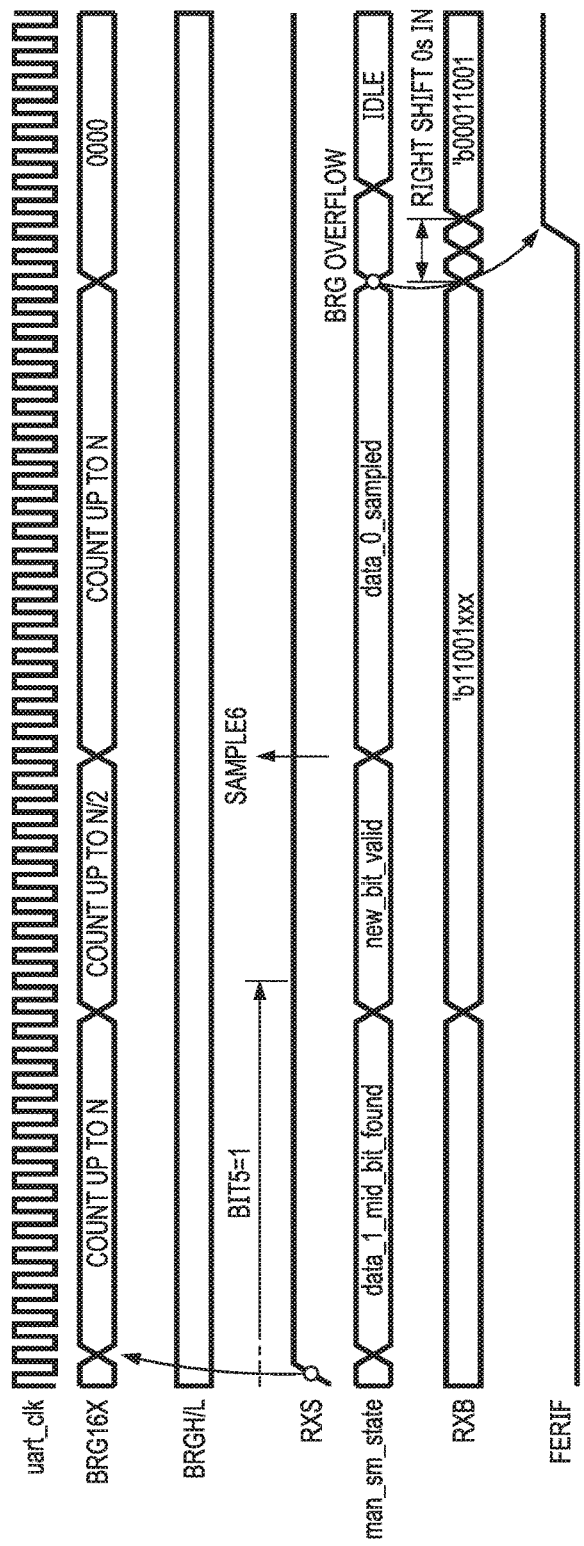
FIG. 13 illustrates a still further example Manchester decoding scheme for receiving, in accordance with certain embodiments of the present disclosure.

FIG. 9 illustrates an example Manchester decoding scheme for transmission, in accordance with certain embodiments of the present disclosure. FIG. 10 illustrates an example Manchester decoding scheme for receiving, in accordance with certain embodiments of the present disclosure. FIG. 11 illustrates a continuing example Manchester decoding scheme for receiving, in accordance with certain embodiments of the present disclosure. FIG. 12 illustrates a further continuing example Manchester decoding scheme for receiving, in accordance with certain embodiments of the present disclosure. FIG. 13 illustrates a still further example Manchester decoding scheme for receiving, in accordance with certain embodiments of the present disclosure. In some embodiments, the clock rate for receive data may be different from that of transmission data; therefore it may be necessary to maintain a separate register to count clocks coming out of BRG. In these timing diagrams this register may be called BRG-RX. This is an internal register and is not available to read or write in the SFR space.

In some embodiments, the UART can decode Manchester encoding using hardware. Software does not have to be invoked to handle a high-to-low transitions of a Manchester decoding scheme. Rather, the UART simply receives recovered data bits. This allows Manchester transmissions of an unlimited (back-to-back) number of bytes, with no need for breaks between bytes.

TX Software Model

In various embodiments, the UART with automated protocol may take advantage of a transmission software model. In such embodiments, model may begin with the UART writing the words to be transmitted into the transmission bus. This may cause the START to be output, which is a low to high transition, followed by one byte of data. As long as transmit words are written into the transmission bus before the shifter becomes empty, the bits are transmitted back to back with no START bit in between them. This allows an unlimited number of bytes to be transmitted back to back after the START bit. When the shifter goes empty, the transmission line goes inactive. When a new word is then written into the transmission bus after it has gone empty, the UART will transmit a new START bit followed by the transmission bus word and the cycle repeats.

RX Software Model

In various embodiments, the UART with automated protocol may take advantage of a receive software model. In such embodiments, model may begin with an inactive (1) followed by a Manchester '1' (low to high). The Manchester half bit time is derived from the first low transition. Any data received is decoded from Manchester and loaded into the receive FIFO.

What is claimed is:

1. An universal asynchronous receiver/transmitter (UART) interface, comprising
 a configurable asynchronous receiver and transmitter unit; and
 a configurable state machine, wherein the state machine allows configuration of the receiver and transmitter unit to support various baud rates and provide for start bit and stop bit configuration, wherein the state machine is further configurable to automatically support a plurality of communication protocols, including separate protocols in a first mode and a second mode;
 wherein the state machine is configured to provide in a second mode automatic support for a break, Make After Break (MAB), frame width, Mark Time Between Frames (MTBF), and Mark Time Between Packets (MTBP).

2. The UART interface according to claim 1, wherein the plurality of communication protocols comprises a Digital Multiplex (DMX) protocol.

3. The UART interface according to claim 1, wherein the plurality of communication protocols comprises a Digital Addressable Lighting Interface (DALI) protocol.

4. The UART interface according to claim 1, wherein the plurality of communication protocols comprises a Local Interconnect Network (LIN) protocol.

5. The UART interface according to claim 1, wherein an operating mode is set through a configuration register.

6. A microcontroller comprising a universal asynchronous receiver/transmitter (UART) interface, the UART interface comprising:
 a configurable asynchronous receiver and transmitter unit; and
 a configurable state machine, wherein the state machine allows configuration of the receiver and transmitter unit to support various baud rates and provide for start bit and stop bit configuration, wherein the state machine is further configurable to automatically support a plurality of communication protocols, including separate protocols in a first mode and a second mode;
 wherein the configurable state machine is configured to provide in a second mode automatic support for a break, Make After Break (MAB), frame width, Mark Time Between Frames (MTBF), and Mark Time Between Packets (MTBP).

7. The microcontroller according to claim 6, wherein the microcontroller is selected from a group consisting of: an 8-bit microcontroller, a 16-bit microcontroller, and a 32-bit microcontroller.

8. The microcontroller according to claim 6, further comprising a timer coupled to the UART interface.

9. The UART interface according to claim 5, wherein the operating mode comprises a Manchester mode.

10. A microcontroller system, comprising
a universal asynchronous receiver/transmitter (UART) interface comprising a configurable asynchronous receiver and transmitter unit; and a configurable state machine, wherein the state machine allows configuration of the receiver and transmitter unit to support various baud rates and provide for start bit and stop bit configuration, wherein the state machine is further configurable to automatically support a plurality of communication protocols, including separate protocols in a first mode and in a second mode;
a microcontroller comprising the UART interface; and
a plurality of components coupled to the microcontroller operable to receive and transmit data via the UART interface;
wherein the configurable state machine is configured to provide in a second mode automatic support for a break, Make After Break (MAB), frame width, Mark Time Between Frames (MTBF), and Mark Time Between Packets (MTBP).

11. The microcontroller system of claim 10, wherein the plurality of communication protocols comprises a Digital Multiplex (DMX) protocol.

12. The microcontroller system of claim 10, wherein the plurality of communication protocols comprises a Digital Addressable Lighting Interface (DALI) protocol.

13. The microcontroller system of claim 10, wherein the plurality of communication protocols comprises a Local Interconnect Network (LIN) protocol.

14. The microcontroller system of claim 10, wherein an operating mode is set through a configuration register.

15. The microcontroller system according to claim 10, wherein the microcontroller is an 8-bit microcontroller.

16. The microcontroller system according to claim 10, further comprising a timer coupled to the UART interface.

17. The microcontroller system according to claim 10, wherein the operating mode comprises a Manchester mode.

18. The microcontroller system of claim 10, wherein the plurality of components comprises a plurality of audio-visual components.

* * * * *